Patented Sept. 5, 1939

2,171,765

UNITED STATES PATENT OFFICE 2,171,765

PROCESS FOR THE POLYMERIZATION OF METHYL METHACRYLATE

Otto Röhm and Ernst Trommsdorff, Darmstadt, Germany, assignors to Röhm & Haas Company, Philadelphia, Pa.

No Drawing. Application December 27, 1935, Serial No. 56,344. In Germany December 31, 1934

4 Claims. (Cl. 260—83)

This invention relates to a process for polymerizing unsaturated organic compounds and particularly to a process by means of which the product may be obtained in the form of granules ranging in size from that of a very fine powder up to that of small peas. It further relates to a process whereby the product obtained may consist of the pure polymer of a single compound or of the joint polymer of two or more compounds or of either of such polymers to which other materials of organic or inorganic nature may be added.

It is an object of this invention to provide a process whereby the polymeric material may be obtained in the form of a powder which is useful for many purposes and is particularly adapted to be used in molding articles of various shapes under heat and pressure.

It has been found that this object can be realized by polymerizing the unsaturated organic compound in an aqueous suspension in the presence of finely divided solid organic or inorganic material which is also suspended or completely dispersed in the water, no dispersing or emulsifying agents being employed as the dispersion of both finely divided solid material and the organic material which is to be polymerized is maintained by mechanical means such as rapid stirring or other violent agitation.

This process may be carried out by suspending a suitable amount of the solid organic or inorganic material in water, stirring the suspension thus formed rather rapidly and after heating to the proper temperature the monomeric material, either pure or dissolved in a suitable solvent, is poured in slowly. The temperature is maintained within the proper range until the polymerization is complete after which the solid polymers may be separated from the water by centrifuging or filtering and then washed and dried. The product thus obtained is usually in the form of a very uniform powder. The size of the grains may be varied almost at will by choice of suitable conditions of stirring, relative amounts of solid material and polymer, amount and type of solvent used etc. but the grain size is very uniform in any given batch and under equal conditions from batch to batch.

Various types of powdered material may be used in the present process. Inorganic powders such as kaolin, talc, barium sulfate, kieselguhr, aluminum oxide, ferric oxide and others which have no harmful effect on the polymer and which do not interfere with the polymerization process may be used. It is often advantageous to use finely divided organic materials as the solid such as powdered resins, both natural and synthetic of various types. The dispersion of such resins may be made mechanically or by dissolving in a solvent miscible with water and then pouring the solution into water so as to cause the resin to precipitate in the form of very fine, completely dispersed particles or globules. It is also possible by this method to make a powder of uniform composition. In such cases the solid used is a powdered form of the polymer of the same composition as the monomeric material which is to be polymerized. In this way a powder capable of being molded into a glass-clear, transparent article may be obtained.

The grain size of any given powder depends, among other things, on the relative proportion of solid and polymerizable material. If, for example, about one part of talc is used with 99 parts of a polymerizable compound such as ethylacrylate, the resulting product has grains about the size of small peas. With 5% of talc the powder is about like sand and with 10% a very fine powder is obtained, which, however, is easily separated from the water by filtration. The rate at which the monomeric material is added to the aqueous suspension of the solid also influences the grain size; the slower the addition, the finer is the powder obtained. This is also affected by the rate at which the particular monomer will polymerize; those polymerizing slowly are added more slowly than those which polymerize more rapidly.

Generally speaking, however, the polymerization is rather rapid and its rate may be controlled within limits by regulation of the temperature. If, for instance, the polymerization proceeds too rapidly, water may be added to cool the reaction mixture.

The product obtained according to the present invention is in a very convenient form for subsequent handling and is entirely free of any monomeric material. Even those polymers which are normally very sticky when dry do not tend to agglomerate to large lumps when wet, thus facilitating filtration, washing and drying.

A great many polymerizable materials may be converted to powdered polymers by this method but it is especially suitable for use with vinyl compounds such as vinyl esters, ethers etc., styrene and also with derivatives of acrylic and α-methacrylic acids, such as esters, amids, nitriles, chlorides and anhydrides. These monomeric materials may be added directly to the aqueous suspension of the solid or they may first be dissolved in a suitable solvent such as alcohol, acetone etc.

and the solution poured into the aqueous suspension. They may be used singly or mixtures of two or more monomers may be used either alone or dissolved in a suitable solvent.

The properties of the polymer may also be varied by adding plasticizers, resins, cellulose esters and ethers, coloring material etc. Polymerization catalysts such as oxygen ozone or compounds which yield oxygen such as organic peroxide, hydrogen peroxide etc. may be added to the monomer or to the water. The solubility of the final product in organic solvents may be influenced by adding to the monomer substances which tend to retard the polymerization. Solvents for the polymer may also be added to the monomer and the polymerization carried out without removing the solvent. In this case, of course, the disperse phase is a solution of the monomer at the beginning of the process and the polymerization actually takes place in a solvent dispersed in water. The presence of solvents has a decided effect on the properties of the product. If, for example, ethyl acrylate is polymerized in the presence of a small amount, 3–5%, of tetralin which is dissolved in the monomer, the polymer obtained is in such a low state of polymerization that the dry product is a strongly adhesive, very viscous mass. On the other hand when no solvent is present the product obtained from ethyl acrylate is a non-adhesive, nervy, rubber-like mass, insoluble in any solvent and shows no tendency to flow even at high pressures and elevated temperatures.

Instead of dispersing the powdered solid material in water, it may be dispersed in the monomeric material and this dispersion can then be poured into the water so as to obtain the suspension of monomer and solid which on heating to the proper temperature yields the polymer in the powder form. Furthermore, it is also possible to generate the powdered or otherwise finely dispersed solid by means of a double decomposition at the time the monomer is added to the water. For example, metal salts such as ferric chloride may be dissolved in the monomer and a neutralizing or precipitating agent such as ammonia or magnesium hydroxide added to the water. When the monomer is poured into the water, ferric hydroxide is precipitated in a flocculent form and this acts as the powdered material causing the final polymeric product to be produced in the form of a fine powder. Other metal salts, such as aluminum chloride, tin chloride, antimony chloride and many others which can form insoluble products with a suitable agent dissolved in the water, may be used. Some salts tend to interfere with the polymerization but as soon as the solution in the monomer is poured into the water the insoluble compound is formed and this has no harmful effect but causes the polymer to be obtained in the desired powdery form. In many cases these precipitates of metal hydroxides can be completely removed from the polymerized product thus leaving a pure organic polymer entirely free of inorganic substances. Resinous or other organic materials such as those obtained by polymerization of unsaturated organic compounds may also be dissolved in the monomer and when such solutions are poured into water prior to polymerization the resin or other material is precipitated and then behaves in the same manner as the powdered material already described. If desired, a partially polymerized vinyl compound may be dissolved in the monomer and this solution poured into water as described above. In such cases the partial polymer may be obtained from the monomer used or the two may be of different composition thus yielding a joint polymer. In this case also the mixture of monomer and polymer may be dissolved in a suitable solvent such as alcohol, acetone etc. prior to pouring into the water.

The products obtained by this process are much superior to those obtained by other polymerization processes with respect to elasticity, nerve, resistance to water, weather, etc.

The invention may be illustrated by the following examples but is not limited to the exact materials or conditions of polymerization shown, as it may be otherwise practiced within the scope of the appended claims.

*Example 1*

5 parts of talc are stirred up in 400 parts of water in a vessel equipped with a reflux condenser and a good stirrer. The suspension thus formed is heated to about 70° C. and 95 parts of ethyl acrylate containing 0.1 per cent. of benzoyl peroxide is added over a period of half an hour during which time the entire mass is stirred well. During the course of the polymerization the temperature rises to the boiling point of water. The polymerization is finished in about 3 hours. The product thus obtained is in the form of fine grains which after centrifuging or filtering is air-dried. The material is insoluble in organic solvents but swells in the known solvents for polymeric ethyl acrylate of intermediate or low degree of polymerization. It may be mixed with further filling or additional materials such as carbon black or talc on the mixing rolls to yield a soft or leather-like product. If 10 parts of talc are used instead of 5, a fine-grained product is obtained and with only 1 part of talc a coarse-grained product.

*Example 2*

10 parts of polymerized methyl methacrylate in powder form are stirred up with 200 parts of water. 90 parts of methyl acrylate is added as in Example 1. The resulting polymerization product is a sandy mass.

*Example 3*

10 parts of barium sulfate are mixed with 200 parts of water while stirring in a vessel equipped with a reflux condenser and 90 parts of butyl acrylate containing 0.2 per cent. of benzoyl peroxide is added over a period of about half an hour at a temperature of 95° C. The polymerization is completed in an hour and a half. The polymer has a particle size about like that of sago and after filtering and drying sticks together to a sponge-like mass.

*Example 4*

90 parts of vinyl acetate containing 0.5 per cent. of benzoyl peroxide is added over a period of 3 hours to a suspension of 10 parts of talc in 200 parts of water at 80° C. After completion of the polymerization the mass is heated for 1 hour at 95° C. The resulting product is a powdery mass which may be easily dried.

*Example 5*

70 parts of butyl methacrylate containing 0.3 per cent. of benzoyl peroxide is added over a period of 4 hours to a suspension of 30 parts of talc in 200 parts of water at 90° C. At the end of 5 hours the polymerization is complete and the polymer is a fine, powdery material which may be molded by pressing or extrusion.

Example 6

95 parts of a 50–50 mixture of vinyl acetate and ethyl acrylate containing 0.2 per cent. of benzoyl peroxide is added slowly while stirring to a suspension of 5 parts of kaolin in 200 parts of water at 75° C. When all of the mixture of vinyl acetate and ethyl acrylate has been added, the temperature is raised to 95° C. and the polymer comes out in the form of a fine powder.

Example 7

95 parts of a 10 per cent. solution of ethyl cellulose in ethyl acrylate containing 0.2 per cent. of benzoyl peroxide is stirred into a suspension of 5 parts of aluminum oxide in 200 parts of water at 80° C. In order to complete the polymerization the mass is heated to 95° C. and the polymer precipitates in a powdery form. The entire polymerization lasts approximately one and one-half hours.

Example 8

50 parts of ethyl acrylate containing 0.2 per cent. of benzoyl peroxide is added to a suspension of 50 parts of talc in 200 parts of water at a temperature of 80° C. The polymerization is completed at the end of an hour and the polymer after drying is a very fine powder.

Example 9

200 parts of a colloidal suspension of aluminum hydroxide containing 2 grams of $Al_2O_3$ per liter is heated to 95° C. A mixture of 40 parts of methyl methacrylate with 60 parts of butyl acrylate containing 0.5 per cent. of benzoyl peroxide is added slowly while stirring. The polymerization is complete after two hours and the polymer is in the form of glass-clear beads which may be freed of any adhering aluminum hydroxide by washing with water. After drying, the polymer is practically free of inorganic constituents.

Example 10

180 parts of ethyl acrylate containing 0.25 per cent. of benzoyl peroxide and 1 per cent. of tetrahydronaphthalene is added to a suspension of 10 parts of talc in 300 parts of water at 95° C. The polymerization is complete at the end of 2 hours and the polymer is obtained in the form of an easily filterable, powdery mass which on drying sticks together quickly to a spongy mass. The product is soluble in solvents for polymeric ethyl acrylate and yields solutions of low viscosity.

Example 11

A solution of 1 part of ferric chloride, 0.3 part of benzoyl peroxide and 100 parts of ethyl acrylate is dropped into 200 parts of water containing 0.5 part of magnesium carbonate in suspension while stirring thoroughly at a temperature of 60–70°. The polymerization is completed in a few hours. The finely powdered polymerization product after drying is colored brown due to the ferric hydroxide.

Example 12

100 parts of ethyl acrylate, in which 0.5 part of a 50 per cent. solution of stannous chloride in ethyl alcohol and 0.5 part of benzoyl peroxide are dissolved, is added while constantly stirring to 400 parts of water at 80–90° C. A white mass consisting of small beads is formed which is washed with water and dried.

The products obtained according to this invention may be used for a great variety of purposes. They may be molded into any desired shape under pressure at elevated temperatures, extruded, worked up into solution for use as laminating layers in safety glass, as adhesives, insulating material, for coating and impregnating various materials etc. They may also be worked on a rubber-mill and other fillers etc. added, for the purpose of forming sheets or thin films.

We claim:

1. In the process of preparing a polymeric ester of methacrylic acid in granular form, the steps which include forming by means of mechanical agitation unaided by any emulsifying agent an aqueous suspension of a finely divided polymeric methacrylic ester and an amount of monomeric methacrylic ester at least ten times as great as that of the polymeric ester, subjecting the continuously agitated suspension to polymerizing influences until polymerization is complete, and discontinuing the agitation to permit settling of the polymeric material.

2. In the process of preparing polymeric methyl methacrylate in granular form, the steps which include forming by means of mechanical agitation unaided by any emulsifying agent an aqueous suspension of finely divided polymeric methyl methacrylate and an amount of monomeric methyl methacrylate at least ten times as great as that of the polymeric ester, subjecting the continuously agitated suspension to polymerizing influences until polymerization is complete, and discontinuing the agitation to permit settling of the polymeric material.

3. In the process of preparing a polymeric ester of methacrylic acid in granular form the steps which include forming by means of mechanical agitation, unaided by any emulsifying agent, an aqueous suspension of a finely divided solid, constantly agitating the suspension and subjecting it to polymerizing influences while slowly adding the ester of methacrylic acid in amount at least ten times that of the solid material, maintaining the agitation and polymerizing influences until polymerization is complete and then discontinuing the agitation to permit settling of the polymeric material.

4. In the process of preparing polymeric methyl methacrylate in granular form the steps which include forming by means of mechanical agitation, unaided by any emulsifying agent, an aqueous suspension of a finely divided solid, constantly agitating the suspension and subjecting it to polymerizing influences while slowly adding the methyl methacrylate in amount at least ten times that of the solid material, maintaining the agitation and polymerizing influences until polymerization is complete and then discontinuing the agitation to permit settling of the polymeric material.

OTTO RÖHM.
ERNST TROMMSDORFF.